(12) United States Patent
Sugiyama et al.

(10) Patent No.: US 11,828,241 B1
(45) Date of Patent: Nov. 28, 2023

(54) CONTROLLER FOR INTERNAL COMBUSTION ENGINE AND METHOD FOR CONTROLLING INTERNAL COMBUSTION ENGINE

(71) Applicant: TOYOTA JIDOSHA KABUSHIKI KAISHA, Toyota (JP)

(72) Inventors: Ryota Sugiyama, Okazaki (JP); Yuto Ikeda, Okazaki (JP); Takanobu Gotoh, Obu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/330,625

(22) Filed: Jun. 7, 2023

(30) Foreign Application Priority Data

Jun. 10, 2022 (JP) ................................. 2022-094248

(51) Int. Cl.
  *F02D 41/02* (2006.01)
  *F01N 9/00* (2006.01)
  *F01N 3/20* (2006.01)

(52) U.S. Cl.
  CPC .......... *F02D 41/0235* (2013.01); *F01N 3/20* (2013.01); *F01N 9/00* (2013.01)

(58) Field of Classification Search
  CPC ............ F02D 41/0235; F02D 41/1446; F02D 41/024; F02D 41/0245; F02D 2200/0802; F02D 2200/0804; F02D 2041/0265; F01N 3/20; F01N 3/36; F01N 11/00; F01N 11/002; F01N 9/00; F01N 2560/06; F01N 2900/1602; F01N 2900/1404; Y02T 10/12; Y02T 10/40
  See application file for complete search history.

(56) References Cited

U.S. PATENT DOCUMENTS

| | | | |
|---|---|---|---|
| 5,996,338 A * | 12/1999 | Hirota | F01N 3/2013 60/285 |
| 2019/0186405 A1* | 6/2019 | Sueoka | F02D 41/401 |
| 2021/0107452 A1 | 4/2021 | Nose et al. | |
| 2022/0080951 A1 | 3/2022 | Nose et al. | |

FOREIGN PATENT DOCUMENTS

JP  2021-060027 A  4/2021

* cited by examiner

*Primary Examiner* — Mark A Laurenzi
*Assistant Examiner* — Dapinder Singh
(74) *Attorney, Agent, or Firm* — Finnegan, Henderson, Farabow, Garrett & Dunner, LLP

(57) ABSTRACT

An internal combustion engine includes a catalyst arranged in an exhaust passage, a fuel injection valve that supplies fuel to a cylinder, and an ignition device. A controller controls a fuel injection amount of the fuel injection valve and an ignition timing of the ignition device. The controller executes a fuel supply process that supplies fuel of the internal combustion engine from the fuel injection valve to the catalyst and a correction process that corrects an amount of fuel supplied to the catalyst during the fuel supply process so that the catalyst is supplied with less fuel when the ignition timing is retarded than when the ignition timing is advanced.

4 Claims, 3 Drawing Sheets

CONTROLLER FOR INTERNAL COMBUSTION ENGINE AND METHOD FOR CONTROLLING INTERNAL COMBUSTION ENGINE

BACKGROUND

1. Field

The following description relates to a controller for an internal combustion engine and a method for controlling an internal combustion engine.

2. Description of Related Art

Japanese Laid-Open Patent Publication No. 2021-60027 describes a fuel supply process performed on an internal combustion engine. The fuel supply process stops supplying fuel to at least one of cylinders while supplying fuel to the remaining cylinders so that the air-fuel ratio of the air-fuel mixture in the remaining cylinders becomes richer than the stoichiometric air-fuel ratio. When the fuel supply process is executed, oxygen and unburned fuel is supplied to a catalyst to heat the catalyst.

In an internal combustion engine, the ignition timing is set by correcting a basic ignition timing, which is set in accordance with the engine operation state, with a retardation correction amount to limit heating of the catalyst and avoid knocking.

In this case, the amount of unburned fuel in the exhaust gas will become greater as the ignition timing becomes further retarded. Thus, when the fuel supply process is executed, the amount of fuel supplied to the catalyst will increase as the ignition timing becomes further retarded. This may result in excessive heating of the catalyst.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for an internal combustion engine is provided. The internal combustion engine includes a catalyst arranged in an exhaust passage, a fuel injection valve configured to supply fuel to a cylinder, and an ignition device. The controller includes processing circuitry. The processing circuitry is configured to control a fuel injection amount of the fuel injection valve and an ignition timing of the ignition device. The processing circuitry is configured to execute a fuel supply process that supplies fuel of the internal combustion engine from the fuel injection valve to the catalyst. The processing circuitry is configured to execute a correction process that corrects an amount of fuel supplied to the catalyst during the fuel supply process so that the catalyst is supplied with less fuel when the ignition timing is retarded than when the ignition timing is advanced.

In another general aspect, a method for controlling an internal combustion engine is provided. The internal combustion engine includes a catalyst arranged in an exhaust passage, a fuel injection valve configured to supply fuel to a cylinder, and an ignition device. The method includes controlling a fuel injection amount of the fuel injection valve and an ignition timing of the ignition device, executing a fuel supply process that supplies fuel of the internal combustion engine from the fuel injection valve to the catalyst, and executing a correction process that corrects an amount of fuel supplied to the catalyst during the fuel supply process so that the catalyst is supplied with less fuel when the ignition timing is retarded than when the ignition timing is advanced.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller for an internal combustion engine according to one embodiment will now be described.

Structure of vehicle including internal combustion engine and controller

Figure 1:
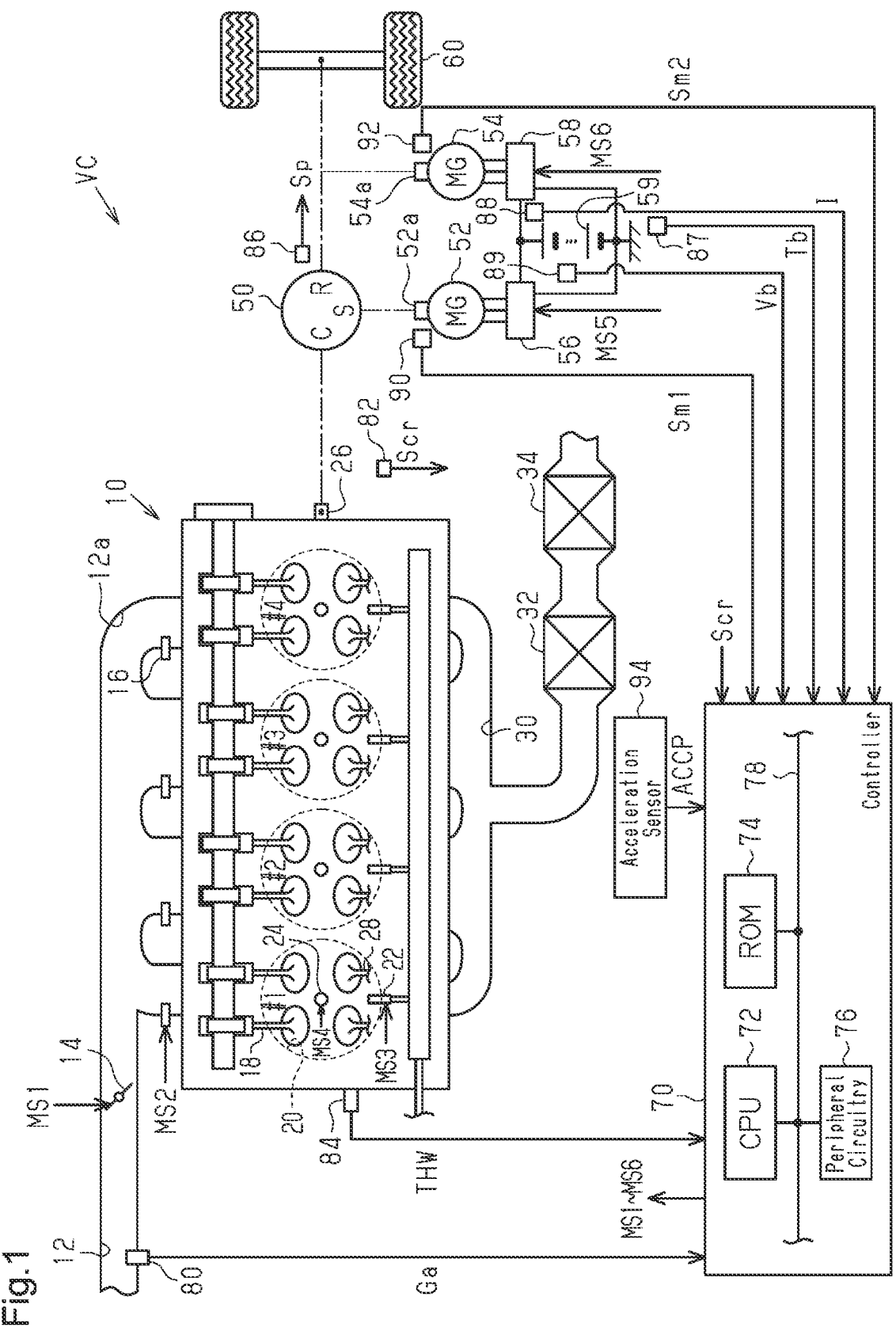
FIG. 1 is a diagram showing the structure of a drive system and a controller for a vehicle according to one embodiment.

As shown in FIG. 1, an internal combustion engine 10 installed in a vehicle VC includes, for example, four cylinders #1 to #4.

The internal combustion engine 10 includes an intake passage 12 in which a throttle valve 14 is arranged. The downstream portion of the intake passage 12 defines an intake port 12a including port injection valves 16 that inject fuel into the intake port 12a. The port injection valves 16 are fuel injection valves that supply fuel to the cylinders of the internal combustion engine 10.

The air drawn into the intake passage 12 and the fuel injected from the port injection valves 16 enter combustion chambers 20 when intake valves 18 open. This supplies the cylinders with air and fuel. Direct injection valves 22 directly inject fuel into the combustion chambers 20. The direct injection valves 22 are also fuel injection valves that supply fuel to the cylinders of the internal combustion engine 10. The mixture of air and fuel in each combustion chamber 20 is burned by the spark discharge of an ignition device 24. The generated combustion energy is converted into the rotational energy of a crankshaft 26.

The air-fuel mixture burned in each combustion chamber 20 is ejected, as exhaust gas, into an exhaust passage 30 when an exhaust valve 28 opens. The exhaust passage 30 includes a three-way catalyst 32, which has the capability to store oxygen, and a gasoline particulate filter (GPF) 34. The GPF 34 includes a three-way catalyst supported by a filter that collects PM.

The crankshaft 26 is mechanically connected to a carrier C of a planetary gear mechanism 50 that forms a power split mechanism. A sun gear S of the planetary gear mechanism 50 is mechanically connected to a rotary shaft 52a of a first motor generator 52, which is a rotating electrical machine. A ring gear R of the planetary gear mechanism 50 is mechanically connected to a rotary shaft 54a of a second motor generator 54, which is a rotating electrical machine, and drive wheels 60.

A first inverter 56 applies alternating voltage to a terminal of the first motor generator 52. A second inverter 58 applies alternating voltage to a terminal of the second motor generator 54. The first inverter 56 and the second inverter 58 are power conversion circuits that convert the terminal voltage of a battery 59, which is a direct voltage source, into alternating voltage.

A controller 70 operates operation units of the internal combustion engine 10 such as the throttle valve 14, the port injection valves 16, the direct injection valves 22, the ignition devices 24, and the like to control torque, a ratio of exhaust gas components, and the like as controlled quantities of the internal combustion engine 10 that are subject to control.

The controller 70 operates the first inverter 56 to control the torque of the first motor generator 52 as a controlled quantity that is subject to control. The controller 70 operates the second inverter 58 to control the torque of the second motor generator 54 as a controlled quantity that is subject to control.

FIG. 1 shows operation signal MS1 of the throttle valve 14, operation signal MS2 of the port injection valves 16, operation signal MS3 of the direct injection valves 22, operation signal MS4 of the ignition devices 24, operation signal MS5 of the first inverter 56, and operation signal MS6 of the second inverter 58.

The controller 70 refers to an intake air amount GA detected by an air flowmeter and an output signal Scr of a crank angle sensor 82 to control a controlled quantity of the internal combustion engine 10. The controller 70 refers to a coolant temperature THW detected by a coolant temperature sensor 84 and an output signal Sp of an output rotation angle sensor 86 that detects the rotation angle of the ring gear R. The controller 70 refers to a temperature Tb of the battery 59 detected by a temperature sensor 87, a charge-discharge current I of the battery 59 detected by a current sensor 88, and a terminal voltage Vb of the battery 59 detected by a voltage sensor 89. The controller 70 refers to an output signal Sm1 of a first rotation angle sensor 90 that detects the rotation angle of the first motor generator 52 to control a controlled quantity of the first motor generator 52. The controller 70 calculates a first rotation speed Nmg1 from the output signal Sm1 as the speed of the rotary shaft 52a of the first motor generator 52. The controller 70 refers to an output signal Sm2 of a second rotation angle sensor 92 that detects the rotation angle of the second motor generator 54 to control a controlled quantity of the second motor generator 54. The controller 70 calculates a second rotation speed Nmg2 from the output signal Sm2 as the speed of the rotary shaft 54a of the second motor generator 54. The controller 70 refers to an accelerator operation amount ACCP, which is the depression amount of an accelerator pedal detected by an acceleration sensor 94. The controller 70 calculates an engine speed NE from the output signal Scr of the crank angle sensor 82. The controller 70 calculates an engine load factor KL from the engine speed NE and the intake air amount GA. The engine load factor KL indicates the ratio of the current cylinder intake air amount to the cylinder intake air amount when the internal combustion engine 10 is being stably operated under a maximum load state. The cylinder intake air amount is the amount of air entering each cylinder in the intake stroke.

The controller 70 includes a CPU 72, a ROM 74, peripheral circuitry 76, and a communication line 78. The CPU 72, the ROM 74, and the peripheral circuitry 76 are configured to communicate with one another through the communication line 78. The peripheral circuitry 76 includes a circuit that generates clock signals for synchronizing internal operations, a power supply circuit, a reset circuit, and the like. The controller 70 controls controlled quantities when the CPU 72 executes programs stored in the ROM 74.

Among the processes executed by the controller 70 shown in FIG. 1, an ignition timing setting process and a regeneration process of the GPF 34 will now be described.

Ignition Timing Setting Process

The controller 70 calculates a basic ignition timing ABASE from the engine speed NE, the engine load factor KL, and the like. In the description hereafter, a compression top dead center TDC will be defined as 0, an ignition timing that is set before the compression top dead center will be defined as a positive value, and an ignition timing that is set after the compression top dead center will be defined as a negative value. Thus, the value of the set ignition timing becomes larger when the ignition timing is further advanced. The retardation amount of the ignition timing is a negative value that retards the ignition timing. As the negative value decreases, that is, as the absolute value of the negative value increases, the ignition timing becomes further retarded. In the description hereafter, an increase in the retardation amount will mean an increase in the absolute value of the retardation amount.

The basic ignition timing ABASE is set to a retarding value, specifically, the smaller one of an MBT ignition timing AMBT and a knock limit ignition timing AKNOK. The MBT ignition timing AMBT is a maximum torque ignition timing that obtains the maximum torque under the current engine operation conditions. The knock limit ignition timing AKNOK is an advancing limit timing of an ignition timing at which knocking will be within an allowable level under the best conditions expected. The MBT ignition timing AMBT and the knock limit ignition timing AKNOK are calculated from the current engine speed NE, the engine load factor KL, and the like.

The controller 70 corrects the basic ignition timing ABASE and sets a final ignition timing AFIN by adding a retardation correction amount AR to the basic ignition timing ABASE.

The retardation correction amount AR is a negative value. Thus, as the retardation correction amount AR decreases, that is, as its absolute value of the retardation correction amount AR increases, the ignition timing AFIN is further retarded. The retardation correction amount AR includes a knocking correction amount KH and a heating correction amount SH. The knocking correction amount KH is a retardation correction amount calculated when the controller 70 executes knocking control to limit knocking. The heating correction amount SH is a retardation correction amount that raises the temperature of the three-way catalyst 32.

In this manner, the ignition timing AFIN is set to a timing retarded from the basic ignition timing ABASE by the retardation correction amount AR. The controller 70 ignites the air-fuel mixture with the ignition device 24 through a spark discharge at the set ignition timing AFIN.

Regeneration Process of GPF

Figure 2:
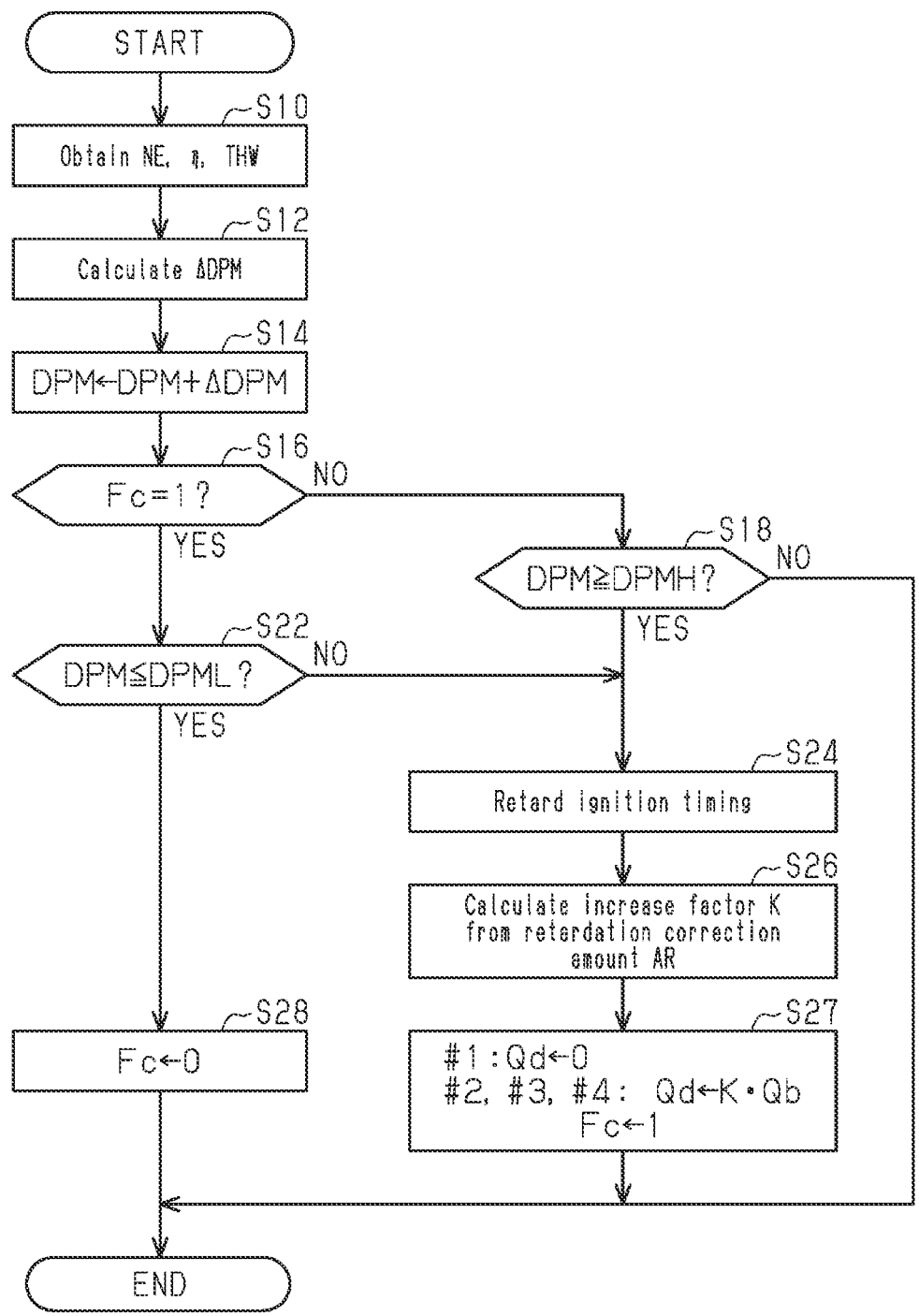
FIG. 2 is a flowchart showing the procedures of a process executed by the controller of the embodiment.

FIG. 2 shows the procedures of a regeneration process. The process shown in FIG. 2 is implemented when the CPU 72 repeatedly executes a program stored in the ROM 74 in, for example, predetermined cycles. In the description hereafter, the alphabet "S" followed by a number will denote a step of the process.

In the process shown in FIG. 2, the CPU 72 first obtains the engine speed NE, a charging efficiency η, and the coolant temperature THW (S10). The engine speed NE is calculated by the CPU 72 from the output signal Scr. The charging efficiency η is calculated by the CPU 72 from the engine speed NE and the intake air amount GA.

Then, the CPU 72 calculates a newly added amount ΔDPM of a deposition amount DPM from the engine speed NE, the charging efficiency η, and the coolant temperature THW (S12). The deposition amount DPM is the amount of PM collected on the GPF 34. Specifically, the CPU 72 calculates the amount of PM in the exhaust gas ejected into the exhaust passage 30 from the engine speed NE, the charging efficiency η, and the coolant temperature THW. The CPU 72 calculates the temperature of the GPF 34 from the engine speed NE and the charging efficiency η. The CPU 72 calculates the newly added amount ΔDPM from the amount of PM in the exhaust gas and the temperature of the GPF 34.

Then, the CPU 72 updates the deposition amount DPM with the newly added amount ΔDPM (S14).

Then, the CPU 72 determines whether an execution flag Fc is set to 1 (S16). The execution flag Fc is set to 1 when a regeneration process that burns and removes PM from the GPF 34 is being executed. The execution flag Fc is set to 0 when the regeneration process is not being executed.

When the CPU 72 determines that the execution flag Fc is 0 (S16: NO), the CPU 72 determines whether the deposition amount DPM is greater than or equal to a regeneration execution value DPMH (S18). The regeneration execution value DPMH is set to a value indicating that a large amount of PM is collected in the GPF 34 and that it is desirable that PM be removed from the GPF 34.

When the CPU 72 determines that the deposition amount DPM is greater than or equal to the regeneration execution value DPMH (S18: YES), the CPU 72 retards the ignition timing to heat the three-way catalyst 32 (S24). In step S24, the CPU 72 calculates the heating correction amount SH from the engine speed NE and the charging efficiency η. If step S24 has not been executed, the value of the heating correction amount SH is set to 0. Further, the CPU 72 sets the ignition timing AFIN based on the retardation correction amount AR including the calculated heating correction amount SH. Thus, when step S24 is executed, the ignition timing AFIN becomes more retarded by the heating correction amount SH than when step S24 has not been executed.

Then, the CPU 72 calculates an increase factor K from the current retardation correction amount AR including the heating correction amount SH, which is calculated in step S24, and the knocking correction amount KH (S26). The increase factor K is a value multiplied by a base injection amount Qb that is the fuel injection amount necessary for the air-fuel ratio of the air-fuel mixture to be equal to the stoichiometric air-fuel ratio. The base injection amount Qb is corrected and increased by the increase factor K so that the air-fuel ratio of the air-fuel mixture in the cylinders becomes richer than the stoichiometric air-fuel ratio. As the increase factor K increases, the air-fuel mixture becomes further richer than the stoichiometric air-fuel ratio. This increases the amount of unburned fuel in the exhaust gas. The CPU 72 calculates the base injection amount Qb by multiplying the charging efficiency η by a predetermined coefficient.

Figure 3:
FIG. 3 is a graph showing the relationship between a retardation amount and an increase factor in the embodiment.

As shown in FIG. 3, the CPU 72 calculates the increase factor K so that the value of the increase factor K decreases as the absolute value of the retardation correction amount AR increases. The CPU 72 obtains the increase factor K from the data of a map stored in the ROM 74. In the map data, the retardation correction amount AR is an input variable and the increase factor K is an output variable. The map data is a data set of discrete values of input variables and values of output variables respectively corresponding to the values of the input variables. When the value of an input variable matches one of the values of input variables in the map data, the value of the corresponding output variable in the map data is used as the increase factor Kt. Further, when the value of the input variable does not match any of the values of the input variables in the map data, a value obtained by interpolating values of the output variables included in the map data is used as the calculation result. The increase factor K may be calculated by multiplying the retardation correction amount AR by a predetermined coefficient.

Next, the CPU 72 executes the regeneration process and sets the execution flag Fc to 1 (S27).

The CPU 72 executes a stop process and a fuel supply process as the regeneration process of the present embodiment. The stop process stops combustion in at least one of the cylinders of the internal combustion engine 10 by stopping the supply of fuel to the port injection valve 16 and the direct injection valve 22 of cylinder #1. Further, the fuel supply process supplies fuel of the internal combustion engine 10 to the three-way catalyst 32. Specifically, the fuel supply process supplies fuel to cylinders #2, #3, #4 so that the air-fuel ratio of the air-fuel mixture in the combustion chambers 20 of cylinders #2, #3, #4 becomes richer than the stoichiometric air-fuel ratio. The primary purpose of these processes is to raise the temperature of the three-way catalyst 32. In other words, oxygen and unburned fuel are ejected into the exhaust passage 30 to oxidize the unburned fuel at the three-way catalyst 32 and raise the temperature of the three-way catalyst 32. The secondary purpose of these processes is to raise the temperature of the GPF 34 and supply oxygen to the heated GPF 34 to oxidize the PM collected on the GPF 34 and remove the PM. In other words, when the temperature of the three-way catalyst 32 is raised, heated exhaust gas flows to the GPF 34 and raises the temperature of the GPF 34. Then, oxygen flows to the heated GPF 34 and oxidizes the PM collected on the GPF 34 to remove the PM.

Specifically, the CPU 72 assigns 0 to a required injection amount Qd of the port injection valve 16 and the direct injection valve 22 of cylinder #1. Further, the CPU 72 assigns a value obtained by multiplying the base injection amount Qb by the increase factor K to required injection amount Q of cylinders #2, #3, #4. Then, the CPU 72 executes the stop process and the fuel supply process by controlling the port injection valve 16 and the direct injection valve 22 of each cylinder so that the fuel injection amount is in accordance with the required injection amount Q. Step S26 and step S27, which multiply the base injection amount Qb by the increase factor K, correspond to a correction process that decreases the amount of fuel supplied to the catalyst during the fuel supply process so that less fuel is supplied when the ignition timing is retarded than when the ignition timing is advanced.

In step S16, when the CPU 72 determines that the execution flag Fc is 1 (S16: YES), the CPU 72 determines whether the deposition amount DPM is less than or equal to a stop threshold value DPML (S22). The stop threshold value DPML is set to a value indicating that the amount of PM collected on the GPF 34 is now small enough to stop the regeneration process.

When the CPU 72 determines that the deposition amount DPM is greater than the stop threshold value DPML (S22: NO), the CPU 72 proceeds to step S24.

When the CPU 72 determines that the deposition amount DPM is less than or equal to the stop threshold value DPML (S22: YES), the CPU 72 sets the execution flag Fc to 0 (S28). The CPU 72 does not execute steps S24, S26, S27.

When step S27 or S28 is completed or a negative determination is made in step S18, the CPU 72 ends the process illustrated in FIG. 2.

Operation and Advantages of Present Embodiment

The operation and advantages of the present embodiment will now be described.

The value of the increase factor K is smaller when the ignition timing AFIN is retarded than when the ignition timing AFIN is advanced. In other words, the increase factor K is set to be a smaller value when the absolute value of the retardation correction amount AR increases, that is, when the retardation amount of the ignition timing AFIN relative to the basic ignition timing ABASE increases, than when the retardation amount decreases. When the increase factor K is set to be a smaller value, the required injection amount Q of cylinders #2, #3, #4 decreases. This reduces the amount of fuel supplied to cylinders #2, #3, #4 and decreases the richness of the air-fuel mixture in each cylinder. Thus, when the fuel supply process is executed, the amount of fuel supplied to the three-way catalyst 32 decreases. In this manner, the increase factor K is set in accordance with the retardation correction amount AR, which is associated with the amount of unburned fuel in exhaust gas. Thus, when the amount of unburned fuel in exhaust gas is increased by retardation of the ignition timing, the fuel supply process decreases the amount of fuel supplied to the three-way catalyst 32. As a result, the fuel suppled to the three-way catalyst 32 will not be excessive. This avoids excessive heating of the three-way catalyst 32.

Accordingly, the amount of fuel supplied to the three-way catalyst 32 during the fuel supply process is smaller when the ignition timing is retarded than when the ignition timing is advanced. This avoids excessive heating of the three-way catalyst 32.

Modifications

The present embodiment may be modified as follows. The present embodiment and the following modifications can be combined if the combined modifications remain technically consistent with each other.

In the above embodiment, as shown in FIG. 3, the increase factor K is calculated so that the value of the increase factor K decreases as the absolute value of the retardation correction amount AR increases. Alternatively, the increase factor K may be set to be smaller when the absolute value of the retardation correction amount AR is greater than or equal to a specified threshold value than when the absolute value of the retardation correction amount AR is less than the threshold value.

Step S24, which retards the ignition timing to heat the three-way catalyst 32, may be omitted. In this case, the increase factor K is set in accordance with the retardation correction amount AR including the knocking correction amount KH. Thus, the advantages described above are obtained.

The increase factor K may be set based on the heating correction amount SH.

The increase factor K may be set based on the knocking correction amount KH.

The stop process may stop the supply of fuel to a cylinder other than cylinder #1.

The supply of fuel may be stopped in two or more cylinders.

The cylinder subject to the fuel supply stop may be cyclically switched.

In the fuel supply process, for example, dither control may be executed. When dither control is executed, less fuel is injected into at least one of the cylinders than the other cylinders so that the air-fuel ratio of the air-fuel mixture in the at least one of cylinders becomes leaner than the stoichiometric air-fuel ratio and the air-fuel ratio of the air-fuel mixture in the other cylinders becomes richer than the stoichiometric air-fuel ratio. In the fuel supply process, for example, lean control may be executed so that, for example, the target air-fuel ratio of the air-fuel mixture in every one of the cylinders becomes leaner than the stoichiometric air-fuel ratio.

The GPF 34 does not need to be arranged at the downstream side of the three-way catalyst 32 in the exhaust passage 30. A post-processing device does not necessarily need to include the GPF 34. The GPF 34 does not need to include a filter that supports a three-way catalyst. For example, the GPF 34 may include only a filter if a three-way catalyst is arranged at the upstream side of the GPF 34.

The internal combustion engine 10 may include one of the port injection valve 16 and the direct injection valve 22.

A hybrid electric vehicle does not need to be a series-parallel hybrid electric vehicle. Instead, the hybrid electric vehicle may be a parallel hybrid electric vehicle. The prime mover of the vehicle may be only the internal combustion engine 10.

The controller is not limited to a device that includes the CPU 72 and the ROM 74 and executes software processing. For example, at least part of the processes executed by the software in the above-illustrated embodiment may be executed by hardware circuits such as ASIC dedicated to executing these processes. That is, the controller may be modified as long as it has any one of the following configurations (a) to (c). (a) A configuration including a processor that executes all of the above-described processes according to programs and a program storage device such as ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. One or any number of software executing devices each including a processor and a program storage device and one or any number of dedicated hardware circuits may be provided. That is, the above processes may be executed by processing circuitry that includes at least one of a set of one or more software-executing devices or a set of one or more dedicated hardware circuits. The program storage device, or computer-readable media, includes any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, wherein the internal combustion engine includes a catalyst arranged in an exhaust passage, a fuel injection valve configured to supply fuel to a cylinder, and an ignition device, the controller comprising:
processing circuitry, wherein:
the processing circuitry is configured to control a fuel injection amount of the fuel injection valve and an ignition timing of the ignition device;
the processing circuitry is configured to execute a fuel supply process that supplies fuel of the internal combustion engine from the fuel injection valve to the catalyst; and
the processing circuitry is configured to execute a correction process that corrects an amount of fuel supplied to the catalyst during the fuel supply process so that the catalyst is supplied with less fuel when the ignition timing is retarded than when the ignition timing is advanced.

2. The controller according to claim 1, wherein:
the ignition timing is a value calculated by correcting a basic ignition timing that is set based on an engine operation state; and
the correction process supplies the catalyst with less fuel when a retardation amount of the ignition timing from the basic ignition timing is larger and more fuel when the retardation amount of the ignition timing from the basic ignition timing is smaller.

3. The controller according to claim 1, wherein:
the cylinder is one of cylinders of the internal combustion engine;
the fuel supply process is executed together with a stop process that stops supplying fuel to one or more of the cylinders, the fuel supply process supplying fuel to a remaining one or more of the cylinders other than the one or more of the cylinders so that an air-fuel ratio of an air-fuel mixture in the remaining one or more of the cylinders becomes richer than a stoichiometric air-fuel ratio; and
the correction process reduces an amount of fuel supplied to the remaining one or more of the cylinders.

4. A method for controlling an internal combustion engine, wherein the internal combustion engine includes a catalyst arranged in an exhaust passage, a fuel injection valve configured to supply fuel to a cylinder, and an ignition device, the method comprising:
controlling a fuel injection amount of the fuel injection valve and an ignition timing of the ignition device;
executing a fuel supply process that supplies fuel of the internal combustion engine from the fuel injection valve to the catalyst; and
executing a correction process that corrects an amount of fuel supplied to the catalyst during the fuel supply process so that the catalyst is supplied with less fuel when the ignition timing is retarded than when the ignition timing is advanced.

* * * * *